United States Patent
Park

(10) Patent No.: US 9,469,305 B2
(45) Date of Patent: Oct. 18, 2016

(54) VEHICLE AND METHOD FOR CONTROLLING THE SAME

(71) Applicant: HYUNDAI MOTOR COMPANY, Seoul (KR)

(72) Inventor: Ki Ru Park, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/528,782

(22) Filed: Oct. 30, 2014

(65) Prior Publication Data

US 2015/0134141 A1    May 14, 2015

(30) Foreign Application Priority Data

Nov. 8, 2013  (KR) .................. 10-2013-0135528

(51) Int. Cl.
    *B60W 50/00*    (2006.01)
    *B60W 50/08*    (2012.01)
    *B60K 35/00*    (2006.01)

(52) U.S. Cl.
    CPC .......... *B60W 50/0098* (2013.01); *B60K 35/00* (2013.01); *B60W 50/08* (2013.01); *B60K 2350/96* (2013.01); *B60W 2050/0029* (2013.01); *B60W 2050/0083* (2013.01); *B60W 2050/0089* (2013.01)

(58) Field of Classification Search
    CPC ............... B60W 50/0098; B60W 2050/0089; B60W 2050/0014; B60W 50/10; B60W 50/08; B60W 2050/0083; B60W 2050/0029; B60K 35/00; B60K 2350/96
    See application file for complete search history.

(56) References Cited

U.S. PATENT DOCUMENTS

| | | | |
|---|---|---|---|
| 6,067,488 A * | 5/2000 | Tano ............................ | 701/33.4 |
| 7,162,215 B2 * | 1/2007 | Videtich et al. ............ | 455/186.2 |
| 2003/0004897 A1 * | 1/2003 | Smith, IV ...................... | 705/76 |
| 2003/0078709 A1 * | 4/2003 | Yester et al. .................... | 701/36 |
| 2005/0221821 A1 * | 10/2005 | Sokola et al. ............. | 455/432.3 |

(Continued)

FOREIGN PATENT DOCUMENTS

| | | |
|---|---|---|
| JP | 2009-154647 A | 7/2009 |
| JP | 2009-173182 A | 8/2009 |

(Continued)

OTHER PUBLICATIONS

Seong-Yong Koo et al., "User Adaptive Service Agent for Future Robot Computer," HCI 2011, 2011.1, pp. 381-384, with English abstract.

(Continued)

*Primary Examiner* — Rodney Butler
(74) *Attorney, Agent, or Firm* — McDermott Will & Emery LLP

(57) ABSTRACT

A vehicle includes a vehicle interface unit, an output of which is controlled according to user manipulation. A vehicle information acquisition unit is configured to acquire information about a vehicle state and an output of the vehicle interface unit in the vehicle state. A storage is configured to store the acquired information about the vehicle state and the output of the vehicle interface unit in the vehicle state. A model generation unit is configured to generate a user preference model using the stored information about the vehicle state and the output of the vehicle interface unit in the vehicle state. A controller is configured to control the output of the vehicle interface unit based on the user preference model.

16 Claims, 21 Drawing Sheets

(56) References Cited

U.S. PATENT DOCUMENTS

| | | |
|---|---|---|
| 2009/0144622 A1* | 6/2009 | Evans et al. .................. 715/706 |
| 2009/0315751 A1* | 12/2009 | Bennie et al. ................. 341/176 |
| 2010/0274410 A1* | 10/2010 | Tsien et al. ........................ 701/1 |
| 2011/0082620 A1* | 4/2011 | Small et al. ..................... 701/29 |
| 2011/0082627 A1* | 4/2011 | Small et al. ..................... 701/48 |
| 2011/0153367 A1* | 6/2011 | Amigo et al. ..................... 705/4 |
| 2011/0205048 A1* | 8/2011 | Lentz ............................. 340/461 |
| 2012/0120345 A1 | 5/2012 | Takato |
| 2012/0289215 A1* | 11/2012 | Elliott et al. .................. 455/418 |
| 2012/0296492 A1* | 11/2012 | Gusikhin et al. ................. 701/1 |
| 2014/0118119 A1* | 5/2014 | Geerlings et al. ........... 340/12.5 |
| 2014/0214933 A1* | 7/2014 | Liu et al. ...................... 709/204 |
| 2015/0081175 A1* | 3/2015 | Fear ................................ 701/49 |
| 2015/0088337 A1* | 3/2015 | Toohy et al. ..................... 701/1 |

FOREIGN PATENT DOCUMENTS

| | | |
|---|---|---|
| KR | 10-0753838 B1 | 8/2007 |
| KR | 2012-0110434 A | 10/2012 |
| WO | 2008/108844 A1 | 9/2008 |

OTHER PUBLICATIONS

Korean Office Action issued in Korean Application No. 10-2013-0135528 dated Jan. 19, 2013, with English translation.

\* cited by examiner

FIG. 18

GENERATE PROBABILITY MODEL

| $P_{AVN}$ (A\|1) = 70% | $P_{CLU}$ (L\|1) = 85% | $P_{HUD}$ (P\|1) = 5% |
|---|---|---|
| $P_{AVN}$ (B\|1) = 30% | $P_{CLU}$ (M\|1) = 5% | $P_{HUD}$ (Q\|1) = 95% |
| $P_{AVN}$ (C\|1) = 0% | $P_{CLU}$ (N\|1) = 10% | $P_{HUD}$ (R\|1) = 0% |
| $P_{AVN}$ (A\|2) = 80% | $P_{CLU}$ (L\|2) = 30% | $P_{HUD}$ (P\|2) = 10% |
| $P_{AVN}$ (B\|2) = 10% | $P_{CLU}$ (M\|2) = 40% | $P_{HUD}$ (Q\|2) = 20% |
| $P_{AVN}$ (C\|2) = 10% | $P_{CLU}$ (N\|2) = 30% | $P_{HUD}$ (R\|2) = 70% |
| $P_{AVN}$ (A\|3) = 90% | $P_{CLU}$ (L\|3) = 75% | $P_{HUD}$ (P\|3) = 100% |
| $P_{AVN}$ (B\|3) = 5% | $P_{CLU}$ (M\|3) = 15% | $P_{HUD}$ (Q\|3) = 0% |
| $P_{AVN}$ (C\|3) = 5% | $P_{CLU}$ (N\|3) = 10% | $P_{HUD}$ (R\|3) = 0% |

FIG. 19

GENERATE RULE MODEL

| | CONDITION | RESULT | SUCCESS RATE | |
|---|---|---|---|---|
| RULE 1 | VEHICLE STATE 1 | AVN SCREEN A | 50% | |
| RULE 2 | VEHICLE STATE 2 | AVN SCREEN A | 80% | |
| RULE 3 | VEHICLE STATE 3 | AVN SCREEN A | 60% | |
| RULE 4 | VEHICLE STATE 1 | CLU SCREEN L | 40% | ⇒ INITIALIZE |
| RULE 5 | VEHICLE STATE 3 | CLU SCREEN L | 90% | |
| RULE 6 | VEHICLE STATE 1 | HUD SCREEN Q | 30% | ⇒ INITIALIZE |
| RULE 7 | VEHICLE STATE 2 | HUD SCREEN R | 70% | |
| RULE 8 | VEHICLE STATE 3 | HUD SCREEN P | 60% | |

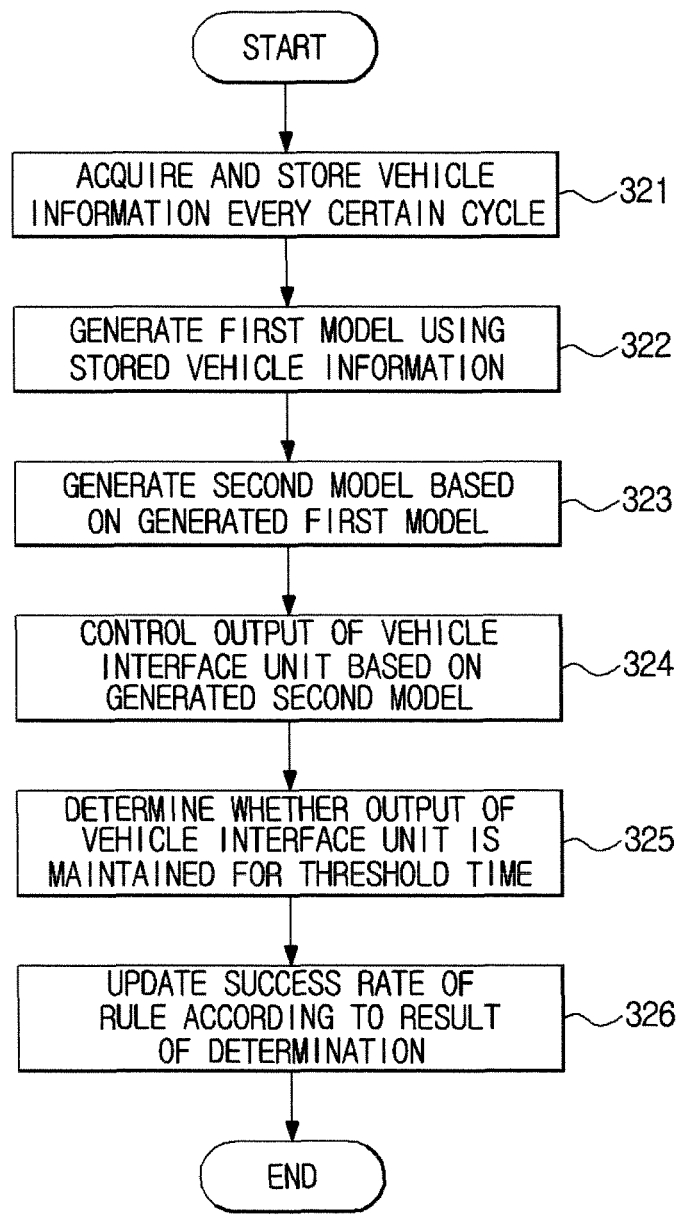

VEHICLE AND METHOD FOR CONTROLLING THE SAME

CROSS-REFERENCE TO RELATED APPLICATION

This application claims the benefit of priority to Korean Patent Application No. 2013-0135528, filed on Nov. 8, 2013 in the Korean Intellectual Property Office, the disclosure of which is incorporated herein by reference.

TECHNICAL FIELD

The present disclosure relates to a vehicle interface system of a vehicle, an output of which varies according to user manipulation, and a method for controlling the same.

BACKGROUND

A vehicle includes various vehicle interface devices for user convenience. Here, the vehicle interface device refers to a device to output visual or audio content or a device to control an environment (e.g., lighting or temperature) inside the vehicle.

New vehicle interface devices are developed or new functions are added to the existing vehicle interface devices to meet demands for user convenience. Examples of the vehicle interface device include a display device such as an audio video navigation (AVN), a cluster and a head up display (HUD), a lighting device to control lighting inside the vehicle, and a temperature control device to control a temperature inside the vehicle (e.g., air conditioner and heater).

To use various-type and various-function vehicle interface devices, corresponding user manipulation is required. However, manipulation of the various vehicle interface devices may be inconvenient to users who are unfamiliar with such devices and may cause safety concerns while driving.

SUMMARY

An aspect of the present disclosure provides a vehicle capable of minimizing manipulation loads and visual attention distribution of a user and improving satisfaction of the user by automatically controlling a vehicle interface unit of a vehicle by reflecting user preference, and a method for controlling the same.

Additional aspects of the invention will be set forth in part in the description which follows and, in part, will be obvious from the description, or may be learned by practice of the invention.

In accordance with one embodiment of the present invention, a vehicle includes a vehicle interface unit, an output of which is controlled according to user manipulation. A vehicle information acquisition unit is configured to acquire information about a vehicle state and the output of the vehicle interface unit in the vehicle state. A storage is configured to store the acquired information about the vehicle state and the output of the vehicle interface unit in the vehicle state. A model generation unit is configured to generate a user preference model using the stored information about the vehicle state and the output of the vehicle interface unit in the vehicle state. A controller is configured to control the output of the vehicle interface unit based on the user preference model.

The vehicle information acquisition unit may acquire the information about the vehicle state and the output of the vehicle interface unit in the vehicle state every first updated cycle.

The first updated cycle may be set or changed by a user.

The vehicle information acquisition unit may erase previous information stored in the storage if a used capacity of the storage exceeds a storage threshold value.

The user preference model may include a first model to indicate a correlation between the vehicle state and the output of the vehicle interface unit as a conditional probability using the stored information about the vehicle state and the output of the vehicle interface unit in the vehicle state.

The user preference model may further include a second model to determine the output of the vehicle interface unit corresponding to a current vehicle state using a rule defined by a vehicle state condition and a display result.

The model generation unit may generate the first model by calculating the conditional probability of the output of the vehicle interface unit for each vehicle state based on the stored information about the vehicle state and the output of the vehicle interface unit in the vehicle state.

The model generation unit may update the first model by calculating the conditional probability every second updated cycle.

The second updated cycle may be equal to or greater than the first updated cycle.

The model generation unit may extract a vehicle state having a conditional probability equal to or greater than a conditional probability threshold value and the output of the vehicle interface unit corresponding to the vehicle state from the first model, and set the extracted vehicle state as the vehicle condition to define the rule and set the extracted output of the vehicle interface unit as the display result to define the rule.

The controller may determine the current vehicle state and search for the rule of the generated second model, in which the current vehicle state is set as the vehicle state condition.

The controller may control the output of the vehicle interface unit according to the display result of the rule in which the current vehicle state is set as the vehicle state condition when the rule is found.

The model generation unit may determine whether the output of the vehicle interface unit is changed within a threshold time after the output of the vehicle interface unit is controlled.

The model generation unit may update a success rate of the rule based on a determination result of whether or not the output of the vehicle interface unit is changed.

The model generation unit may increase the success rate of the rule if the output of the vehicle interface unit is not changed for the threshold time after the output of the vehicle interface unit is controlled.

The model generation unit may reduce the success rate of the rule if the output of the vehicle interface unit is changed within the threshold time after the output of the vehicle interface unit is controlled.

The model generation unit may erase a rule having a success rate dropped to be equal to or less than a success rate threshold value, and initialize the conditional probability corresponding to the erased rule.

The vehicle interface unit may include at least one of an audio video navigation (AVN) device, a cluster, a head up display (HUD), and a temperature control device to control temperature inside the vehicle.

In accordance with another embodiment of the present invention, a method for controlling a vehicle including a vehicle interface unit, an output of which varies according to user manipulation includes acquiring and storing information about a vehicle state and an output of the vehicle interface unit in the vehicle state. A user preference model is generated using the stored information about the vehicle state and the output of the vehicle interface unit in the vehicle state. The output of the vehicle interlace unit is controlled based on the user preference model.

The step of acquiring and storing may include acquiring and storing the information about the vehicle state and the output of the vehicle interface unit in the vehicle state every first updated cycle.

The method may further include erasing old information stored in a storage to store the information about the vehicle state and the output of the vehicle interface unit in the vehicle state if a used capacity of the storage exceeds a storage threshold value.

The step of generating the user preference model may include generating a first model to indicate a correlation between the vehicle state and the output of the vehicle interface unit as a conditional probability using the stored information about the vehicle state and the output of the vehicle interface unit in the vehicle state.

The generating of the user preference model may further include generating a second model to determine the output of the vehicle interface unit corresponding to a current vehicle state using a rule defined by a vehicle state condition and a display result.

The step of generating the user preference model may include generating the first model by calculating the conditional probability of the output of the vehicle interface unit for each vehicle state based on the stored information about the vehicle state and the output of the vehicle interface unit in the vehicle state.

The step of generating the user preference model may include calculating the conditional probability every second updated cycle.

The step of generating the second model may include extracting a vehicle state having a conditional probability equal to or greater than a conditional probability threshold value and an output of the vehicle interface unit corresponding to the vehicle state from the first model. The extracted vehicle state is set as the vehicle state condition to define the rule, and the extracted output of the vehicle interface unit is set as the display result to define the rule.

The step of controlling the output may include determining the current vehicle state and searching for the rule of the generated second model, in which the current vehicle state is set as the vehicle state condition.

The step of controlling the output may include controlling the output of the vehicle interface unit according to the display result of the rule in which the current vehicle state is set as the vehicle state condition when the rule is found.

The method may further include determining whether the output of the vehicle interface unit is changed within a threshold time after the output of the vehicle interface unit is controlled.

The method may further include determining a success rate of the rule based on a determination result of whether the output of the vehicle interface unit is changed.

The step of determining may include increasing the success rate of the rule if the output of the vehicle interface unit is not changed for the threshold time after the output of the vehicle interface unit is controlled.

The step of determining may include reducing the success rate of the rule if the output of the vehicle interface unit is changed within the threshold time after the output of the vehicle interface unit is controlled.

The method may further include erasing a rule having a success rate dropped to be equal to or less than a success rate threshold value, and initializing the conditional probability corresponding to the erased rule.

BRIEF DESCRIPTION OF THE DRAWINGS

These and/or other aspects of the invention will become apparent and more readily appreciated from the following description of the embodiments, taken in conjunction with the accompanying drawings.

FIG. 18 is a table showing an example of a first model generated by a model generation unit.

FIG. 19 is a table showing an example of a second model generated by the model generation unit.

FIG. 21 is a flowchart of a method for controlling a vehicle in consideration of a success rate of a rule of a second model, according to an embodiment of the present invention.

DETAILED DESCRIPTION

Figure 1:
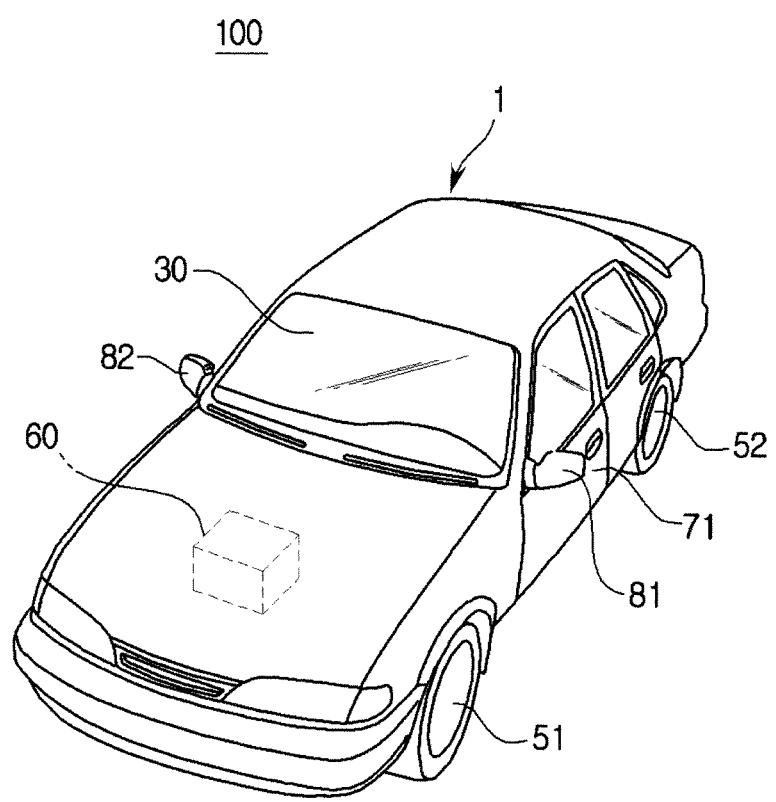
FIG. 1 is an external view of a vehicle according to an embodiment of the present invention.

Reference will now be made in detail to the embodiments of the present invention, examples of which are illustrated in the accompanying drawings, wherein like reference numerals refer to like elements throughout.

FIG. 1 is an external view of a vehicle according to an embodiment of the present invention.

Referring to FIG. 1, a vehicle 100 includes a body 1 to form an exterior of the vehicle 100 and wheels 51 and 52 to move the vehicle 100. A drive unit 60 rotates the wheels 51 and 52, and doors 71 and 72 (see FIG. 4) isolate an internal space of the vehicle 100 from an external environment. A windshield glass 30 provides a view in front of the vehicle 100 to a driver inside the vehicle 100, and side-view mirrors 81 and 82 provides a view behind the vehicle 100 to the driver.

The wheels 51 and 52 include the front wheels 51 provided at a front part of the vehicle 100 and rear wheels 52 provided at a rear part of the vehicle 100. The drive unit 60 provides torque to the front wheels 51 or the rear wheels 52 to move the body 1 in a forward or backward direction. The drive unit 60 may use an internal combustion engine to generate a torque by burning fossil fuel or a electric motor to generate a torque by receiving electricity from a capacitor (not shown).

The doors 71 and 72 are rotatably provided at left and right sides of the body 1 to allow the driver to enter the vehicle 100 in an open state thereof and to isolate the internal space of the vehicle 100 from an external environment in a closed state thereof.

The windshield glass 30 is provided at a top front part of the body 1 to allow the driver inside the vehicle 100 to acquire visual information in front of the vehicle 100. The side-view mirrors 81 and 82 include a left side-view mirror 81 provided at the left side of the body 1 and a right side-view mirror 82 provided at the right side of the body 1, and allow the driver inside the vehicle 100 to acquire visual information beside or behind the vehicle 100.

In addition, the vehicle 100 may include sensing devices such as a proximity sensor to sense an obstacle or another vehicle behind the vehicle 100, and a rain sensor to sense rain and the amount of rain.

For example, the proximity sensor transmits a sensing signal to a side or the back of the vehicle 100, and receives a reflection signal reflected from then obstacle such as the other vehicle. The proximity sensor may sense whether the obstacle exists behind the vehicle 100, and detect the location of the obstacle based on the waveform of the received reflection signal. The proximity sensor may use a scheme for transmitting an ultrasonic wave and detecting the distance to the obstacle using the ultrasonic wave reflected from the obstacle.

Figure 2:
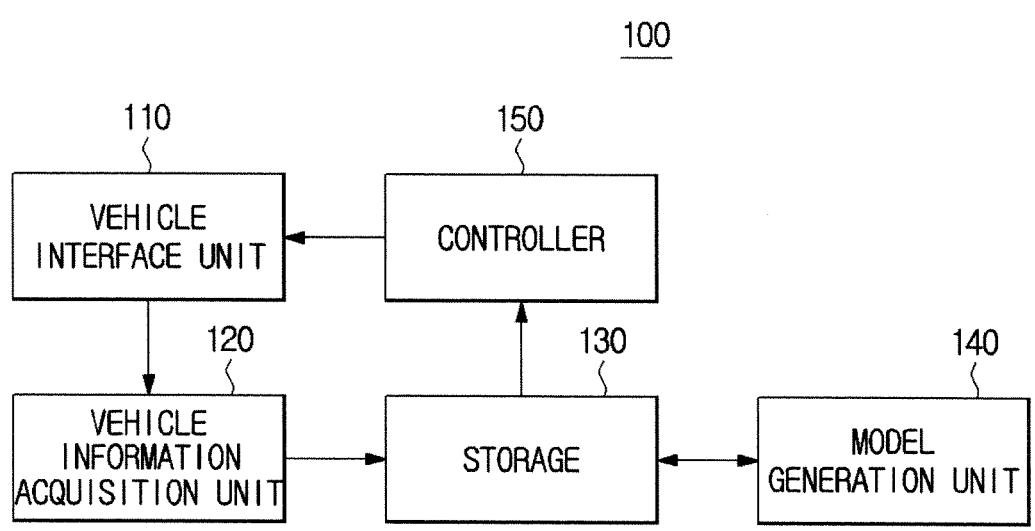
FIG. 2 is a block diagram of the vehicle, according to an embodiment of the present invention.

FIG. 2 is a block diagram of the vehicle 100, according to an embodiment of the present invention.

Referring to FIG. 2, the vehicle 100 includes a vehicle interface unit 110, the output of which is controlled according to user manipulation. A vehicle information acquisition unit 120 is configured to acquire vehicle information, and a storage 130 is configured to store the acquired vehicle information. A model generation unit 140 is configured to generate a user preference model using the stored vehicle information. A controller 150 is configured to control the output of the vehicle interface unit 110 according to the user preference model. In an embodiment of the present invention, the vehicle information includes information about a vehicle state and the output of the vehicle interface unit 110 in the vehicle state.

The vehicle interface unit 110 may include all devices, the output of which is controlled, i.e., variable, according to user manipulation. For example, the vehicle interface unit 110 may be a device to output visual or audio content or a device to control an environment (e.g., lighting or temperature) inside the vehicle 100.

A user includes a driver and a passenger. When the driver starts the vehicle 100 and thus power is supplied to the vehicle interface unit 110, the user may turn on the vehicle interface unit 110 or the vehicle interface unit 110 may be automatically turned on.

When the vehicle interface unit 110 is turned on, the user may manipulate the vehicle interface unit 110 to output a desired result. For example, the user may manipulate the vehicle interface unit 110 to display a desired image if the vehicle interface unit 110 is a display device, or manipulate the vehicle interface unit 110 to adjust the color or brightness of lighting inside the vehicle 100 to a desired color or brightness if the vehicle interface unit 110 is a lighting device. Alternatively, the user may manipulate the vehicle interface unit 110 to adjust the temperature inside the vehicle 100 to a desired temperature if the vehicle interface unit 110 is a temperature control device.

The vehicle information acquisition unit 120 acquires vehicle information and stores the acquired vehicle information in the storage 130. The acquired vehicle information may be updated in a certain cycle. The cycle to update the vehicle information is referred to as a first update cycle. For example, the vehicle information may be acquired every 0.1 sec. or every 1 sec. The first update cycle may be set by default when the vehicle 100 is designed, or set and changed by the user thereafter.

The vehicle information may be stored in the form of a database, and the storage 130 may include at least one memory device capable of inputting and outputting information, for example, a hard disk, flash memory, random access memory (RAM), or an optical disc drive.

The model generation unit 140 may generate a user preference model using the vehicle information stored in the storage 130, and store the generated user preference model in the storage 130. In an embodiment of the present invention, the user preference model refers to a model in which a specific vehicle state is mapped to an output of the vehicle interface unit 110 by the user.

Since the user preference model generated by the model generation unit 140 is based on the vehicle information stored in the storage 130, the user preference model may be updated as the vehicle information is updated.

The controller 150 controls the output of the vehicle interface unit 110 based on the user preference model. Specifically, the controller 150 determines a current vehicle state, and determines an output of the vehicle interface unit 110 corresponding to the current vehicle state, based on the user preference model. Then, the controller 150 controls the output of the vehicle interface unit 110 to correspond to the current vehicle state.

As described above, the vehicle interface unit 110 may include various devices, the output of which varies according to the user manipulation. However, in the following embodiments, it is assumed for convenience of explanation that the vehicle interface unit 110 is a display device including an audio video navigation (AVN) device 111, a cluster 112, and a head up display (HUD) module 113.

Figure 3:
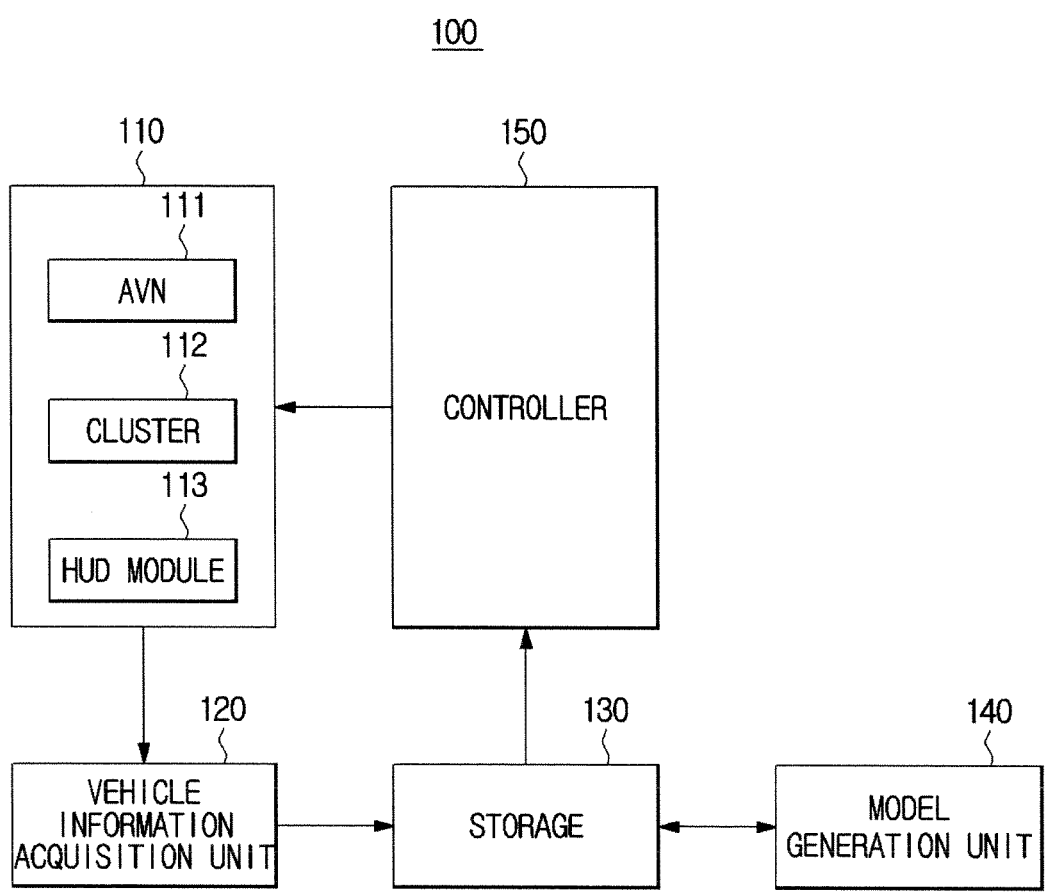
FIG. 3 is a block diagram of the vehicle in which a vehicle interface unit of the vehicle is a display device.
Figure 4:
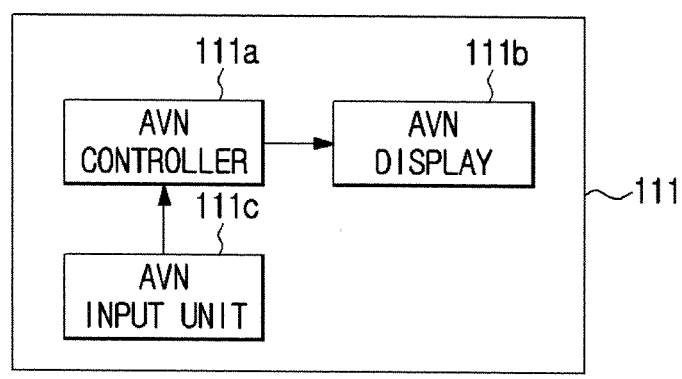
FIG. 4 is a detailed block diagram of the vehicle interface unit, according to an embodiment of the present invention.
Figure 4:
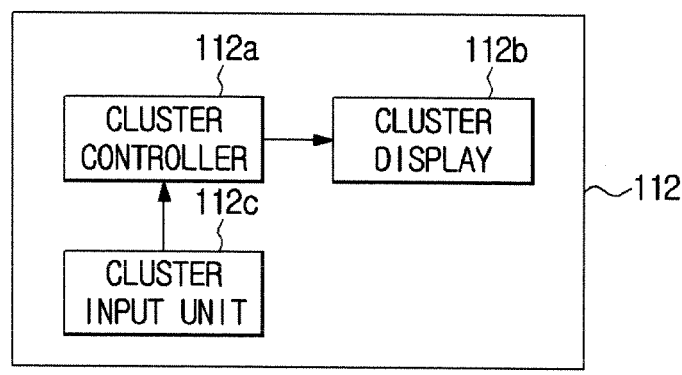
Figure 4:
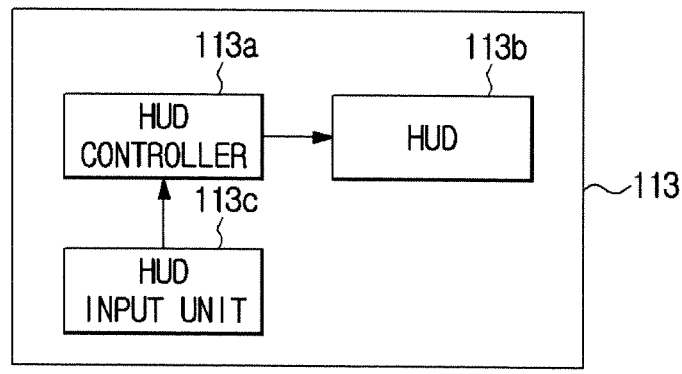

FIG. 3 is a block diagram in which the vehicle interface unit 110 of the vehicle 100 is a display device, and FIG. 4 is a detailed block diagram of the vehicle interface unit 110, according to an embodiment of the present invention.

As illustrated in FIGS. 3 and 4, the vehicle interface unit 110 may include the AVN device 111, the cluster 112, and the HUD module 113.

The AVN device 111 is a device capable of performing audio, video and navigation functions according to user manipulation, and may simultaneously perform two or more functions. For example, the AVN device 111 may simultaneously perform the navigation function with the audio function to reproduce music recorded on a CD or a USB drive, or simultaneously perform with the video function to display a digital multimedia broadcasting (DMB) image.

The AVN device 111 includes an AVN display 111b to display a screen related to the audio function, a screen related to the video function, and a screen related to the navigation function. An AVN controller 111a is configured to control overall functions performed by the AVN device 111 and generate an image to be displayed on the AVN display 111b, and an AVN input unit 111c is configured to receive a control command regarding the AVN device 111 from the user.

In addition, although not shown in FIG. 4, the AVN device 111 may further include a sound output unit to output sound when the audio, video or navigation function is performed.

The cluster 112 includes a cluster display 112b to display driving information, navigation information, audio information, etc. of the vehicle 100 according to user manipulation, a cluster controller 112a configured to control overall functions performed by the cluster 112 and generate an image to be displayed on the cluster display 112b, and a cluster input unit 112c configured to receive a control command regarding the cluster 112 from the user.

The HUD module 113 includes an HUD 113b to display speed information, navigation information, proximity sensor information, etc. of the vehicle 100 according to user manipulation. An HUD controller 113a is configured to control overall functions performed by the HUD module 113 and generate an image to be displayed on the HUD 113b, and an HUD input unit 113c is configured to receive a control command regarding the HUD module 113 from the user.

Figure 5:
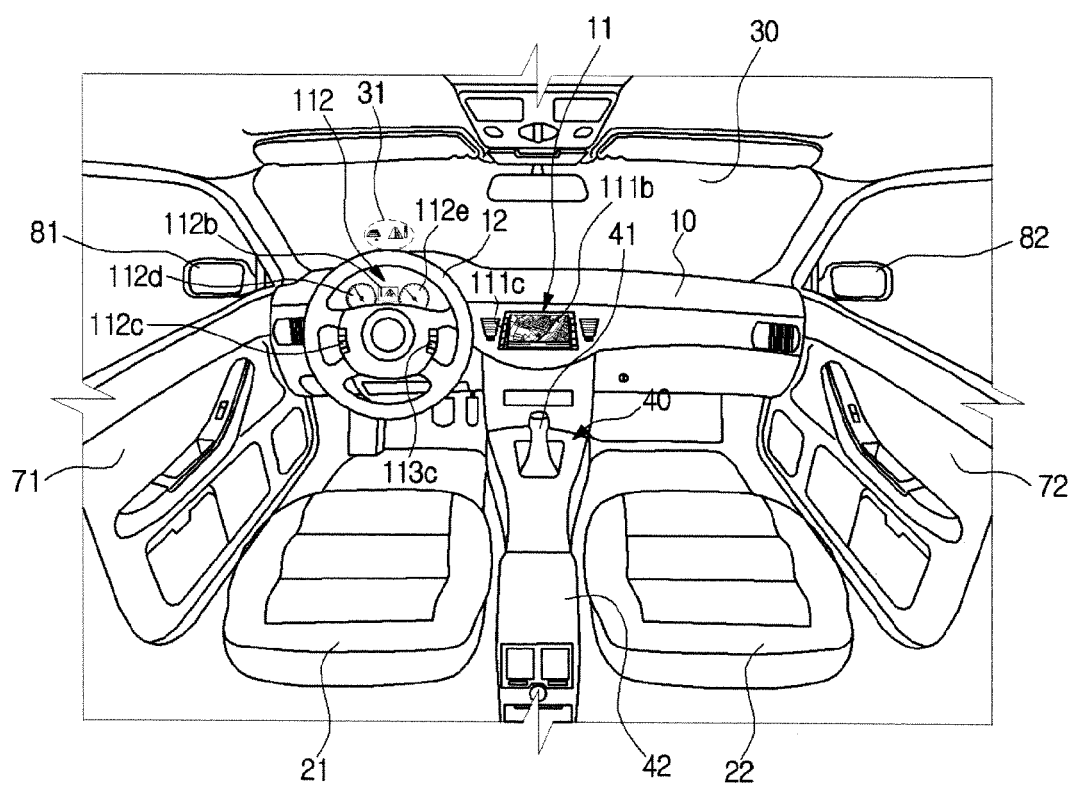
FIG. 5 is an external view of the vehicle interface unit of the vehicle, according to an embodiment of the present invention.
Figure 6:
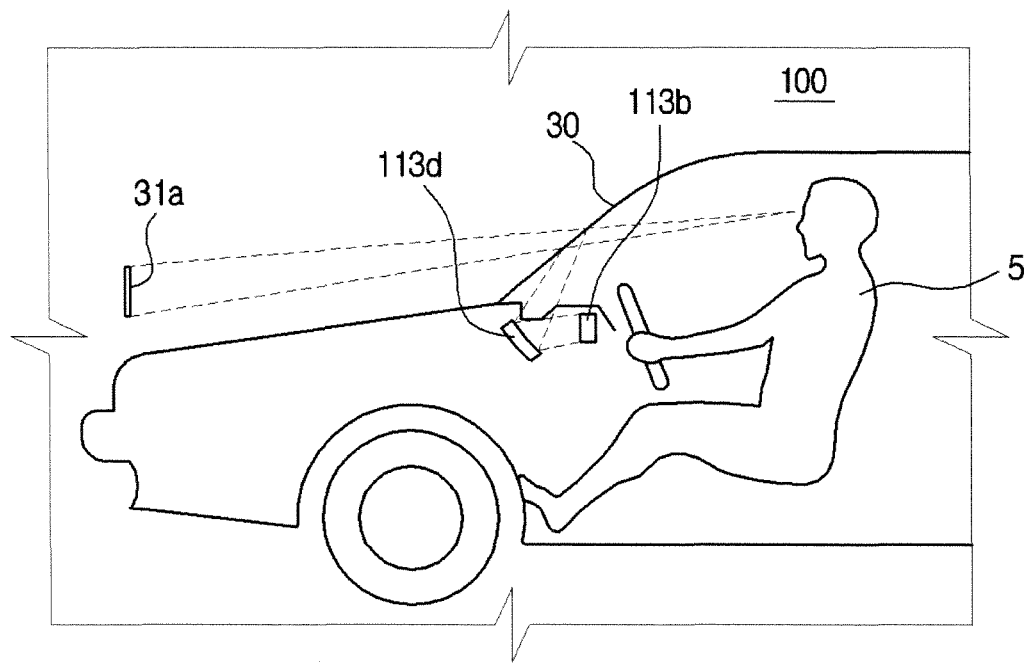
FIG. 6 is a structural view of a head up display (HUD) module of the vehicle, according to an embodiment of the present invention.

FIG. 5 is an external view of the vehicle interface unit 110 of the vehicle 100, according to the embodiment of the present invention, and FIG. 6 is a structural view of the HUD module 113 of the vehicle 100, according to the embodiment of the present invention.

Referring to FIG. 5, the AVN display 111b may be provided on a center fascia 11 of a dashboard 10 at a front part of the vehicle 100 to allow the user, and more particularly, the driver to view or manipulate a displayed image while driving. The center fascia 11 refers to a central area of the dashboard 10 on which a control panel board is located between a driver seat 21 and a passenger seat 22.

The AVN display 111b may be implemented as a liquid crystal display (LCD), a light emitting diode (LED), a plasma display panel (PDP), an organic light emitting diode (OLED), a cathode ray tube (CRT), etc.

The AVN input unit 111c may be provided near the AVN display 111b in the form of hard keys as illustrated in FIG. 5. Alternatively, if the AVN display 111b is implemented as a touchscreen, the AVN input unit 111c may be provided on an area of the AVN display 111b in the form of soft keys.

The cluster 112 is provided on an area of the dashboard 10 facing a steering wheel 12 to allow the driver to check a gauge while driving, and the cluster display 112b may also be implemented as the LCD, the LED, the PDP, the OLED, the CRT, etc.

The cluster 112 may further include a speed gauge 112d to indicate the speed of the vehicle 100 and a revolutions per minute (RPM) gauge 112e to indicate RPM of the vehicle 100. In addition to the cluster display 112b, the cluster display 112b may be disposed between the speed gauge 112d and the RPM gauge 112e as illustrated in FIG. 5. However, the above description is merely exemplary and embodiments of the present invention are not restricted by the location of the cluster display 112b.

The cluster input unit 112c may be provided on an area of the steering wheel 12 in the form of hard keys so as to be manipulated by the driver while grasping the steering wheel 12. Alternatively, the cluster input unit 112c may be provided behind the steering wheel 12 in the form of a lever such that the user may control the cluster 112 by pushing the lever forward, backward, upward, or downward.

The HUD module 113 is a device to display visual information provided to the user, on the windshield glass 30 of the vehicle 100. An image output from the HUD module 113 is displayed on a display area 31 of the windshield glass 30 as illustrated in FIG. 6. A detailed description is now given of the configuration and operation of the HUD module 113 with reference to FIG. 6.

Referring to FIG. 6, the HUD 113b may be provided at a front part of the vehicle 100, and a reflective plate 113d may be provided in front of the HUD 113b. When the HUD 113b outputs an image in the forward direction, the output image is reflected on the reflective plate 113d and then projected onto the windshield glass 30. In this case, the windshield glass 30 functions as a combiner.

Since the projected image is viewed by a driver 5 after being reflected from the windshield glass 30, although the driver 5 views the image on the display area 31 of the windshield glass 30 as illustrated in FIG. 5, the image which is actually viewed by the driver 5 is a virtual image 31a formed outside the windshield glass 30.

The configuration of the HUD module 113 illustrated in FIG. 6 is merely an embodiment of the present invention, and a plurality of or no reflective plates 113d may be provided or a diffractive element may be additionally provided according to the structure of the HUD module 113.

Referring back to FIG. 5, like the cluster input unit 112c, the HUD input unit 113c may also be provided on an area of the steering wheel 12 in the form of hard keys so as to be manipulated by the driver while grasping the steering wheel 12. Alternatively, the HUD input unit 113c may be provided behind the steering wheel 12 in the form of a lever such that the user may control the HUD module 113 by pushing the lever forward, backward, upward, or downward.

Although the AVN input unit 111c, the cluster input unit 112c and the HUD input unit 113c are separately provided in the embodiment of FIG. 5, the AVN input unit 111c may further perform the function of the cluster input unit 112c or the HUD input unit 113c, the cluster input unit 112c may further perform the function of the AVN input unit 111c or the HUD input unit 113c, or the HUD input unit 113c may further perform the function of the AVN input unit 111c or the cluster input unit 112c.

Figure 7:
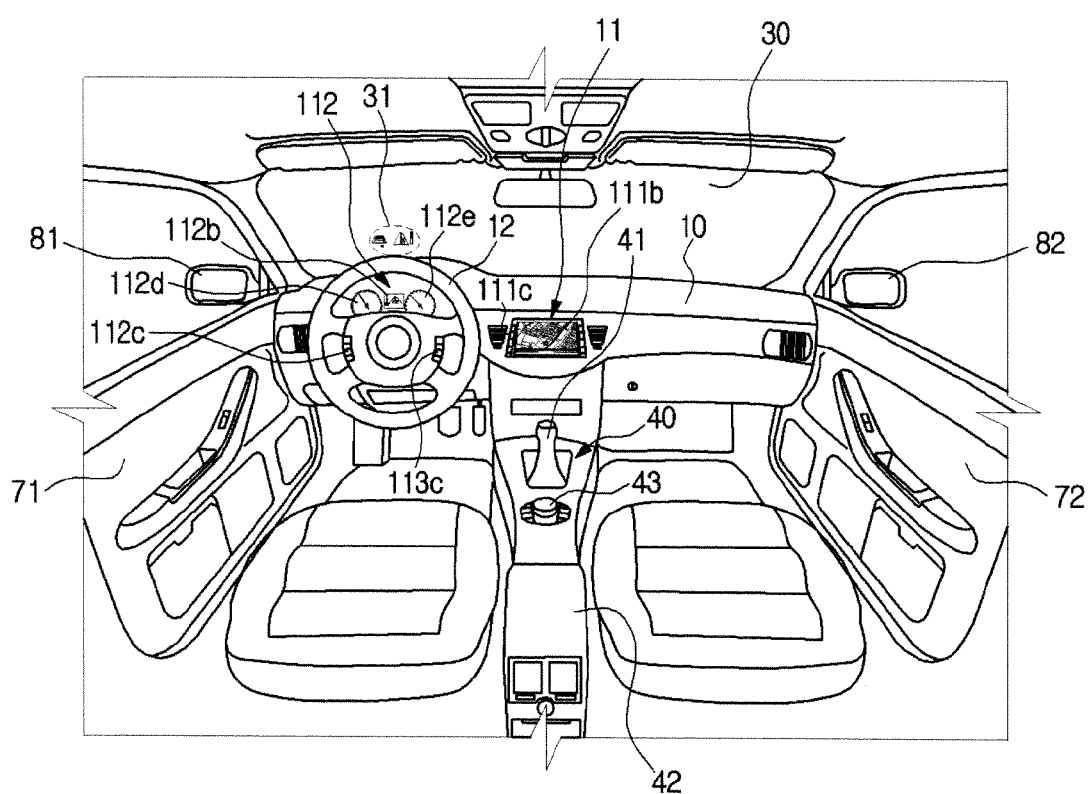
FIG. 7 is an external view of another example of input units of the vehicle, according to an embodiment of the present invention.

FIG. 7 is an external view of another example of the AVN input unit 111c, the cluster input unit 112c and the HUD input unit 113c of the vehicle 100, according to an embodiment of the present invention.

Referring to FIG. 7, the vehicle 100 may include a center console 40 which is located between the driver seat 21 and the passenger seat 22 and on which a gear lever 41 and a tray 42 are formed.

A jog shuttle 43 or a joystick may be further formed on the center console 40, and thus, at least one of the AVN input unit 111c, the cluster input unit 112c and the HUD input unit 113c may be implemented as the jog shuttle 43. In this case, the user may control the AVN device 111, the cluster 112, or the HUD module 113 by pushing the jog shuttle 43 forward, backward, leftward, or rightward, or rotating the jog shuttle 43.

If at least one of the AVN input unit 111c, the cluster input unit 112c, and the HUD input unit 113c is formed on the center console 40, the jog shuttle 43 illustrated in FIG. 7 is merely an example applicable to an embodiment of the present invention, and the form of hard keys is also available instead of the jog shuttle 43 or the joystick.

As described above, the vehicle information acquisition unit 120 acquires the vehicle information every first update cycle by determining the current vehicle state and the outputs of the AVN display 111b, the cluster display 112b and the HUD 113b. A description is now given of examples of the vehicle information with reference to FIGS. 8 to 17.

Figure 8:
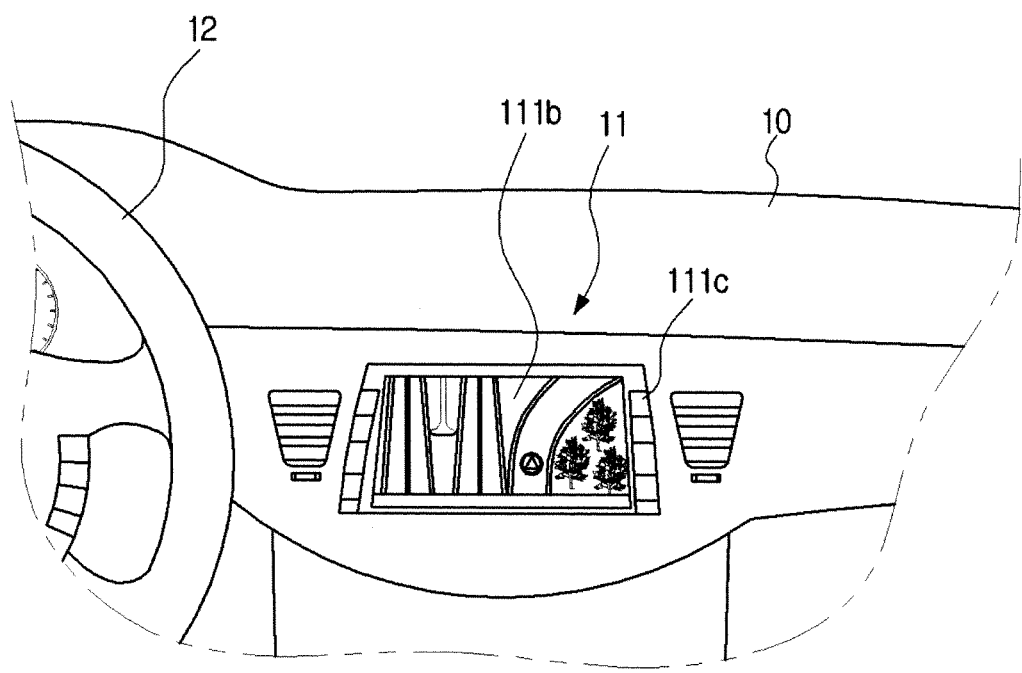
FIG. 8 illustrates an example in which a navigation screen is displayed on an audio video navigation (AVN) display.
Figure 9:
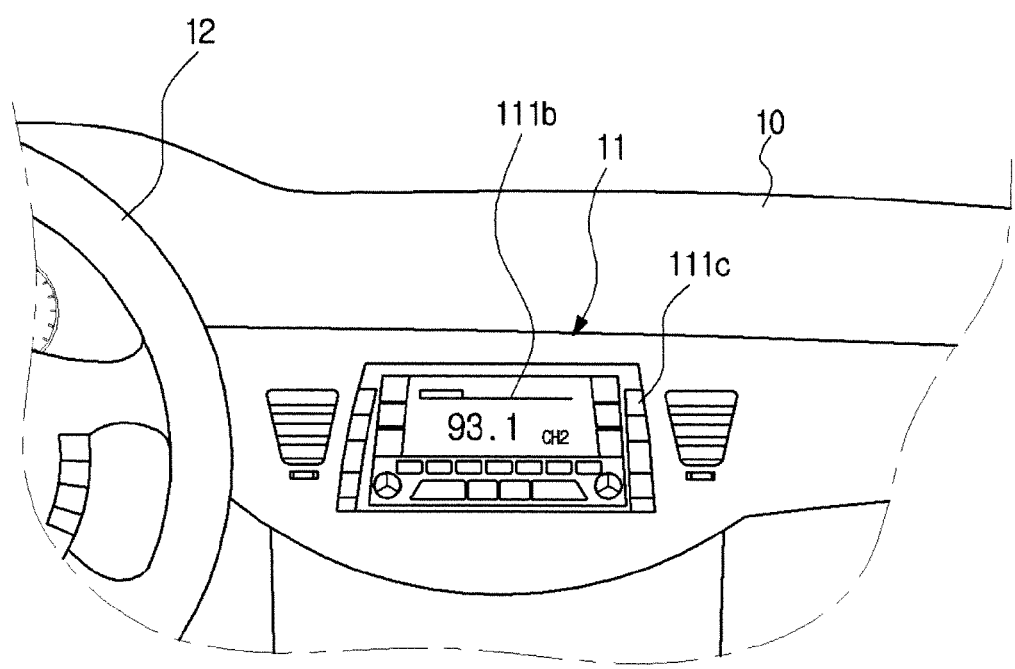
FIG. 9 illustrates an example in which an audio screen is displayed on the AVN display.
Figure 10:
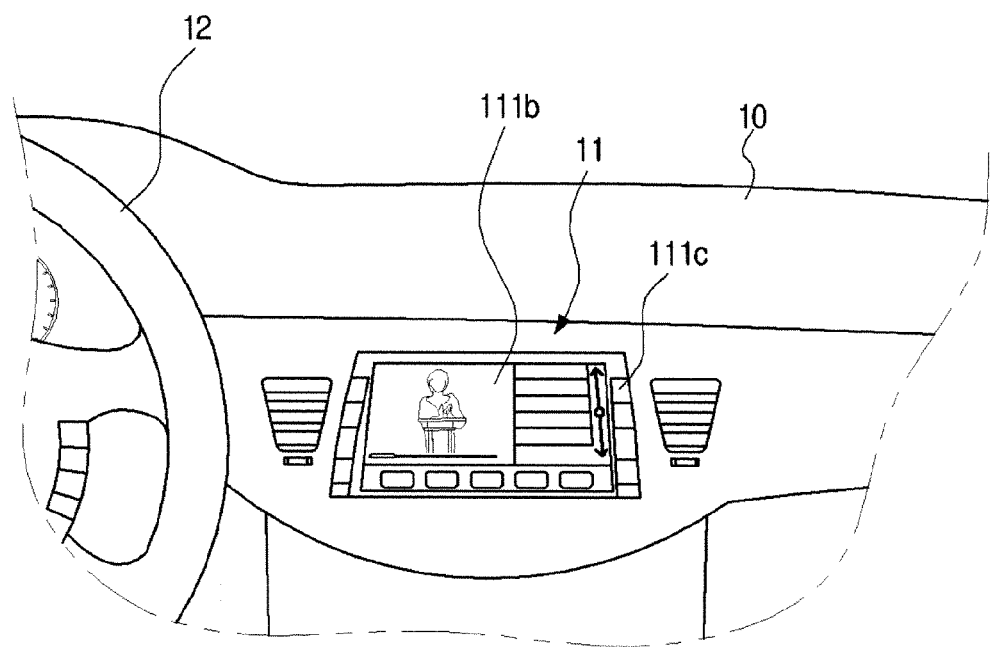
FIG. 10 illustrates an example in which a digital multimedia broadcasting (DMB) screen is displayed on the AVN display.

FIG. 8 illustrates an example in which a navigation screen is displayed on the AVN display 111b. FIG. 9 illustrates an example in which an audio screen is displayed on the AVN display 111b, and FIG. 10 illustrates an example in which a digital multimedia broadcasting (DMB) screen is displayed on the AVN display 111b.

If the user manipulates the AVN input unit 111c to select the navigation function, the navigation screen is displayed on the AVN display 111b as illustrated in FIG. 8. Even though two or more functions including the navigation function are selected, the user may select the navigation screen to be displayed on the AVN display 111b.

For example, since the navigation function may be selected to provide guidance to a destination, and simultaneously, the audio function may be selected to play music, in this case, the AVN input unit 111c may be manipulated to display the navigation screen on the AVN display 111b.

If the user manipulates the AVN input unit 111c to select the audio function, the audio screen is displayed on the AVN display 111b as illustrated in FIG. 9, and sound is output from a sound output unit (not shown). Even though two or more functions including the audio function are selected, the user may select the audio screen to be displayed on the AVN display 111b.

As described above, since the navigation function may be selected to provide guidance to a destination, and simultaneously, the audio function may be selected to play music, in this case, the AVN input unit 111c may be manipulated to display the audio screen on the AVN display 111b and provide guidance to a destination with sound only through the sound output unit.

If the user manipulates the AVN input unit 111c to select the video function, the DMB screen may be displayed on the AVN display 111b as illustrated in FIG. 10. DMB is an example of the video function, and the video function may further include a function to reproduce video data recorded on a DVD or a USB drive, in addition to DMB.

Even though two or more functions including the video function are selected, the user may select the DMB screen to be displayed on the AVN display 111b.

For example, since the navigation function may be selected to provide guidance to a destination, and simultaneously, the video function may be selected to view the DMB, the AVN input unit 111c may be manipulated to display the DMB screen on the AVN display 111b and provide guidance to the destination with sound only through the sound output unit.

Figure 11:
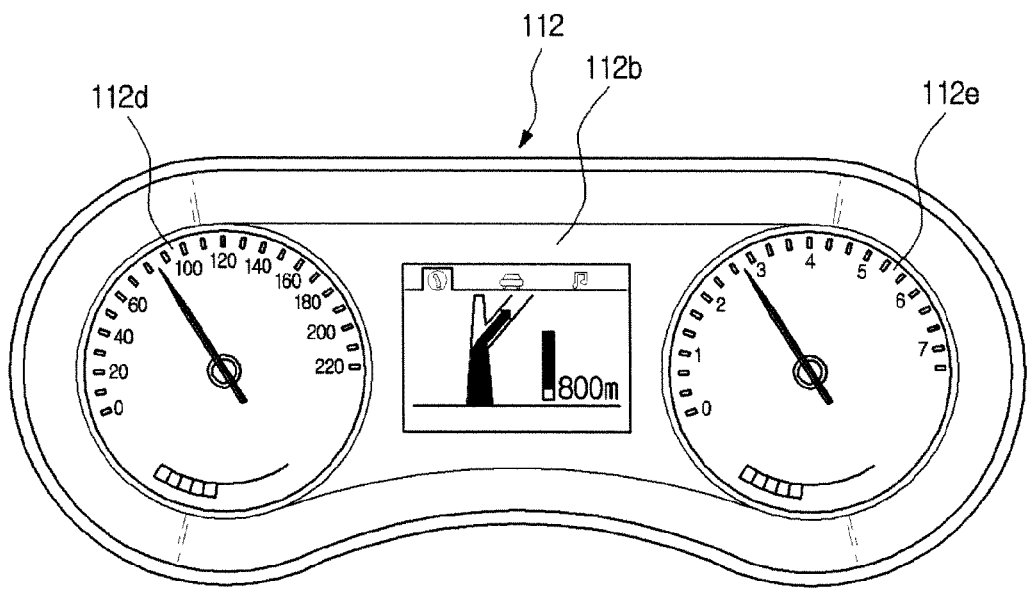
FIG. 11 illustrates an example in which a navigation screen is displayed on a cluster display.
Figure 12:
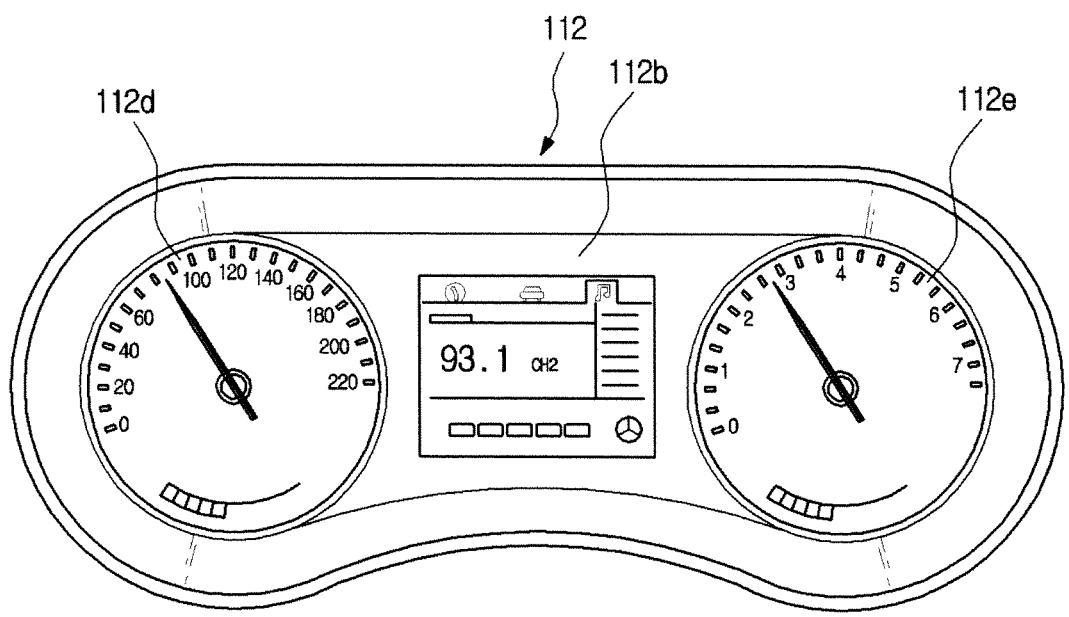
FIG. 12 illustrates an example in which a driving information screen is displayed on the cluster display.
Figure 13:
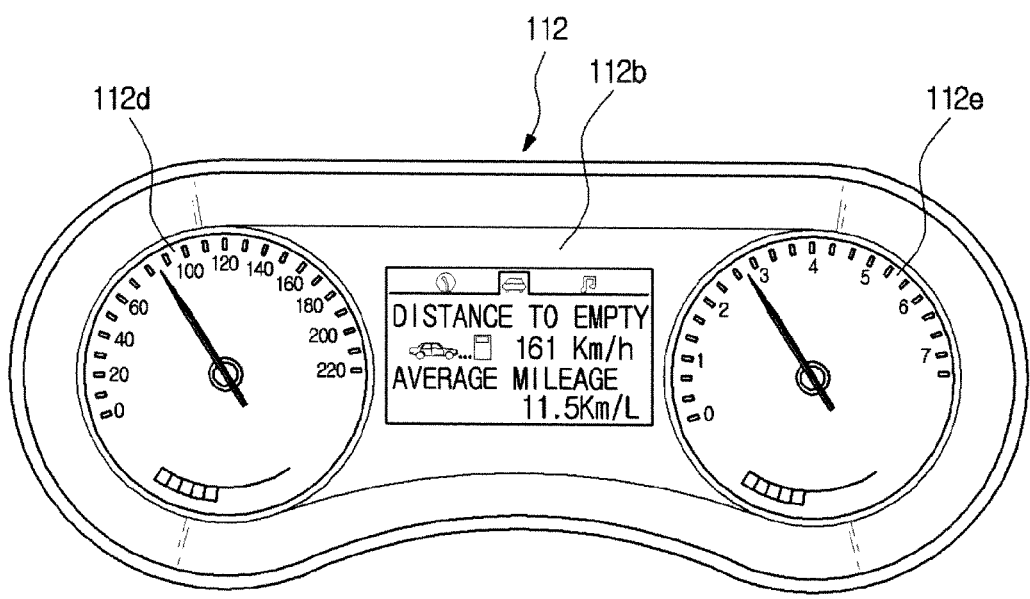
FIG. 13 illustrates an example in which an audio screen is displayed on the cluster display.

FIG. 11 illustrates an example in which a navigation screen is displayed on the cluster display 112b, FIG. 12 illustrates an example in which a driving information screen is displayed on the cluster display 112b, and FIG. 13 illustrates an example in which an audio screen is displayed on the cluster display 112b.

If the user manipulates the cluster input unit 112c to display the navigation screen, the navigation screen is displayed on the cluster display 112b as illustrated in FIG. 11.

The cluster display 112b may briefly display information in consideration of spatial constraints. Accordingly, when the navigation screen is displayed, path information for guidance to a destination may be displayed more briefly compared to the screen displayed on the AVN display 111b of FIG. 8.

If the user manipulates the cluster input unit 112c to display the driving information screen, the driving information screen is displayed on the cluster display 112b as illustrated in FIG. 12. The driving information screen may display information about a driving distance or time from a reset point to a current point, the distance to empty according to a current amount of fuel, an average mileage according to fuel consumption, etc. In addition, other types of information about driving of the vehicle 100 may also be displayed.

If the user manipulates the cluster input unit 112c to display the audio screen, the audio screen may be displayed on the cluster display 112b as illustrated in FIG. 13. As described above in relation to FIG. 11, the cluster display 112b may briefly display information in consideration of spatial constraints.

Figure 14:
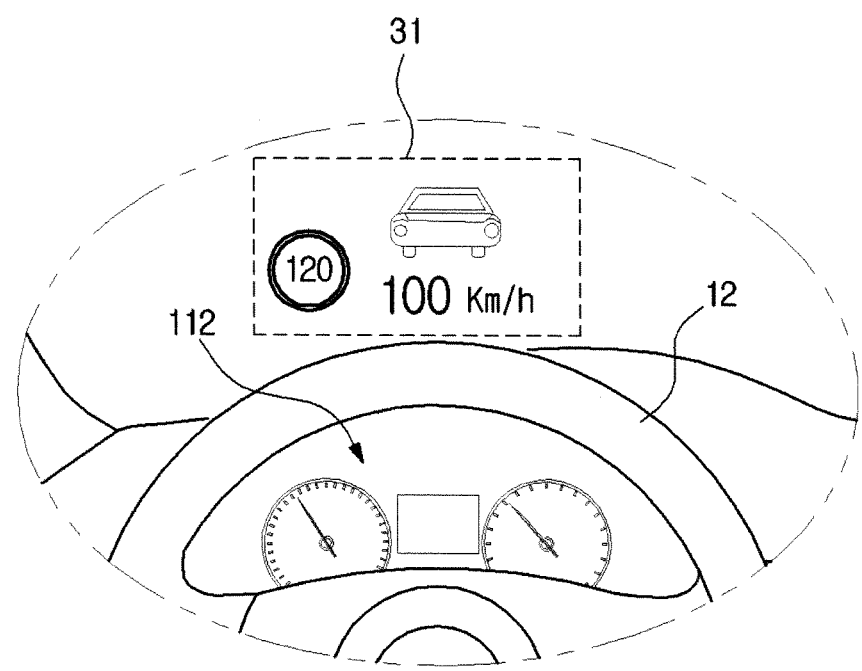
FIG. 14 illustrates an example in which a speed information screen is displayed on an HUD.
Figure 15:
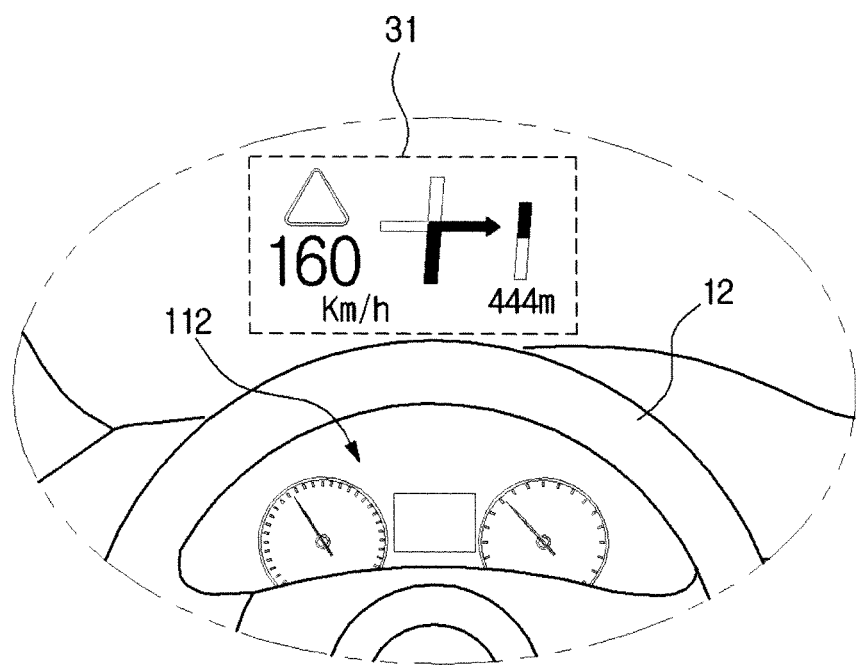
FIG. 15 illustrates an example in which a navigation screen is displayed on the HUD.
Figure 16:
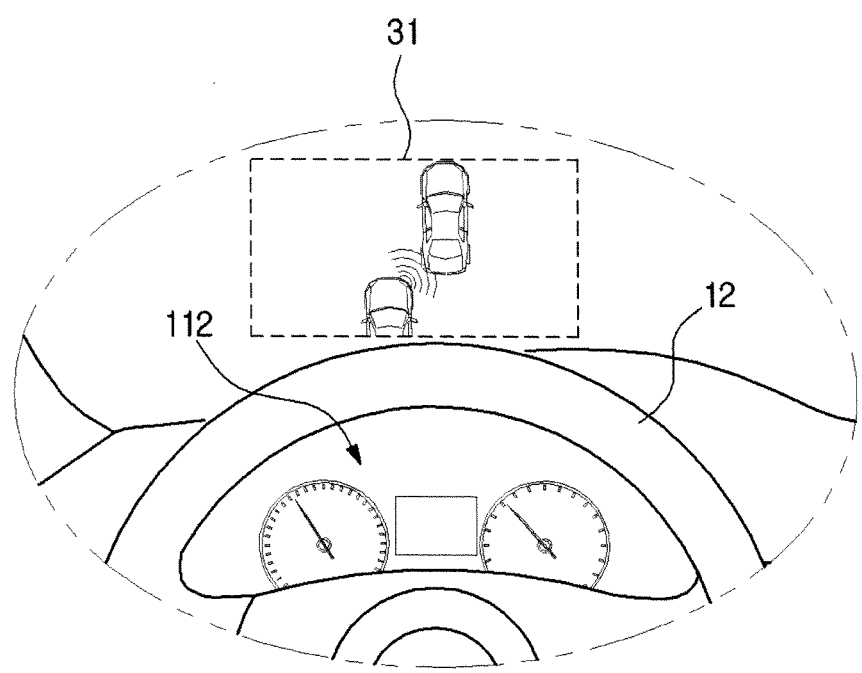
FIG. 16 illustrates an example in which a proximity sensor screen is displayed on the HUD.

FIG. 14 illustrates an example in which a speed information screen is displayed on the HUD 113b, FIG. 15 illustrates an example in which a navigation screen is displayed on the HUD 113b, and FIG. 16 illustrates an example in which a proximity sensor screen is displayed on the HUD 113b.

If the user manipulates the HUD input unit 113c to display the speed information screen, a screen indicating a current speed of the vehicle 100 and a speed limit at a current location is displayed on the HUD 113b as illustrated in FIG. 14. As described above in relation to FIG. 6, an image displayed on the HUD 113b is viewed by the user on the display area 31 of the windshield glass 30, the image viewed on the display area 31 is the image displayed on the HUD 113b.

If the user manipulates the HUD input unit 113c to display the navigation screen, the navigation screen is displayed on the HUD 113b as illustrated in FIG. 15.

The HUD 113b may also briefly display information in consideration of spatial constraints. Accordingly, when the navigation screen is displayed, path information for guidance to a destination may be displayed more briefly compared to the screen displayed on the AVN display 111b of FIG. 8.

If the user manipulates the HUD input unit 113c to display the proximity sensor screen, the proximity sensor screen is displayed on the HUD 113b as illustrated in FIG. 16. The proximity sensor screen is a screen to visually indicate the distance between the vehicle 100 and an object adjacent to the vehicle 100 based on information sensed by a proximity sensor mounted on the vehicle 100.

Screens to be displayed on the AVN display 111b, the cluster display 112b and the HUD 113b are not limited to those illustrated in FIGS. 8 to 16. In addition to the illustrated screens, various screens to provide information about the vehicle 100 and information for user convenience may be displayed. However, in the following embodiment, it is assumed for convenience of explanation that the AVN display 111b, the cluster display 112b and the HUD 113b display the screens illustrated in FIGS. 8 to 16.

Information about screens displayed on the AVN display 111b, the cluster display 112b and the HUD 113b is the information about the output of the vehicle interface unit 110, which is included in the vehicle information. Accordingly, the vehicle information acquisition unit 120 may acquire information about a vehicle state and screens displayed on the AVN display 111b, the cluster display 112b and the HUD 113b at a point of time when the information is acquired.

Figure 17:
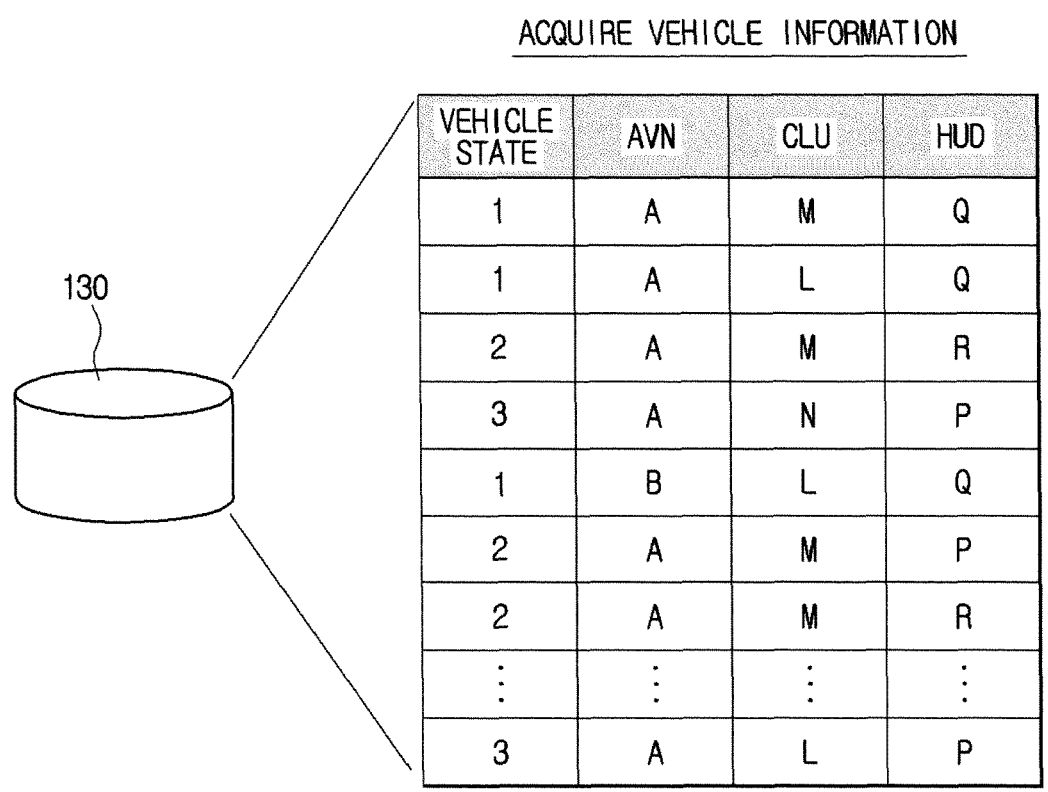
FIG. 17 is a table showing information stored in a storage.

FIG. 17 is a table showing information stored in the storage 130.

Referring to FIG. 17, the vehicle information acquisition unit 120 acquires information about a vehicle state and screens displayed on the AVN display 111b ("AVN" in FIG. 17), the cluster display 112b ("CLU" in FIG. 17), and the HUD 113b ("HUD" in FIG. 17) every first update cycle, and stores the information in the storage 130.

"A," "B," and "C" indicate types of the screen displayed on the AVN display 111b. For example, "A" may indicate a navigation screen, "B" may indicate an audio screen, and "C" may indicate a video screen.

"L," "M," and "N" indicate types of the screen displayed on the cluster display 112b. For example, "L" may indicate a navigation screen, "M" may indicate a driving information screen, and "N" may indicate an audio screen.

"P," "Q," and "R" indicate types of the screen displayed on the HUD 113b. For example, "P" may indicate a speed information screen, "Q" may indicate a navigation screen, and "R" may indicate a proximity sensor screen.

Three vehicle states such as vehicle state 1, vehicle state 2, and vehicle state 3 are defined in the current example, and may be defined based on one or a combination of acquirable individual pieces of information. Each vehicle state may be set by a designer or the user.

The information used to define the vehicle state may include whether a destination is set, whether the vehicle 100 is driven during the day/at night, whether the brake is depressed, the speed of the vehicle 100, whether the vehicle 100 is powered on/off, external air temperature, rain sensor information, global positioning system (GPS) information (indicating road types), road information (acquired by a navigation device), current time, whether an AVN function is performed, etc.

For example, the vehicle state may be defined based on whether the speed of the vehicle 100 is equal to or greater than 70 km/h and whether it rains (rain sensor information), or based on whether the speed of the vehicle 100 is equal to or greater than 100 km/h and whether the vehicle 100 is on an expressway (GPS information).

In the current example, the vehicle state is defined based on a combination of whether a destination is set and whether the vehicle 100 is driven during the day/at night. Vehicle state 1 is defined as a state in which the destination is set and the vehicle 100 is driven at night, vehicle state 2 is defined as a state in which the destination is not set and the vehicle 100 is driven at night, and vehicle state 3 is defined as a state in which the destination is set and the vehicle 100 is driven during the day.

Each vehicle state and screens displayed on the AVN display 111b, the cluster display 112b and the HUD 113b corresponding to the vehicle state form one piece of vehicle information.

If vehicle information at the first row of FIG. 17 is the oldest information stored in the storage 130, the information indicated at the first row indicates that a vehicle state determined at a specific point of time when the vehicle information is acquired is a state in which a destination is set and the vehicle 100 is driven at night (vehicle state 1), a navigation screen is displayed on the AVN display 111b, a driving information screen is displayed on the cluster display 112b, and a navigation screen is displayed on the HUD 113b.

The information indicated at the second row of FIG. 17 indicates that a vehicle state determined at a point of time after a time corresponding to the first update cycle has passed from the specific point of time when the information indicated at the first row is acquired is a state in which a destination is set and the vehicle 100 is driven at night (vehicle state 1), and a navigation screen is displayed on all of the AVN display 111b, the cluster display 112b and the HUD 113b.

In this manner, the vehicle information acquisition unit 120 may acquire up to the most recent vehicle information and store the acquired vehicle information in the storage 130.

However, since the storage 130 has a limited capacity, if a used capacity of the storage 130 exceeds a preset threshold capacity, old information may be erased. Whether the used capacity exceeds the threshold capacity may be determined by directly measuring the used capacity or based on whether a preset threshold time has elapsed.

The latter case is based on a fact that the vehicle information acquisition unit 120 updates the vehicle information every certain cycle (first update cycle), and thus, the capacity of stored information is predictable over time. Accordingly, the threshold time used to determine whether the used capacity exceeds the threshold capacity may be determined according to the first update cycle and the capacity of the storage 130.

Determination of the used capacity and transmission of an erase command may be performed by the vehicle information acquisition unit 120 or the controller 150.

The model generation unit 140 generates a user preference model based on the vehicle information stored in the storage 130, and the user preference model may include two-step models (e.g., first model and second model) to improve reliability.

FIG. 18 is a table showing an example of a first model generated by the model generation unit 140, and FIG. 19 is a table showing an example of a second model generated by the model generation unit 140.

The first model is a probability model to indicate a correlation between the vehicle state and the output of the vehicle interface unit 110 as a probability value using the theory of conditional probability. Accordingly, the model generation unit 140 may generate the first model by calculating a conditional probability of the output of the vehicle interface unit 110 for each vehicle state based on the vehicle information stored in the storage 130.

The first model includes conditional probabilities about various cases defined by the vehicle state and the output of the vehicle interface unit 110. For example, the various cases may include a case in which the vehicle state is vehicle state 1, and the AVN display 111b displays a navigation screen, a case in which the vehicle state is vehicle state 1 and the AVN display 111b displays a video screen, a case in which the vehicle state is vehicle state 2, and the cluster display 112b displays a driving information screen, etc.

Since a conditional probability P (b|a) indicates a probability that event b occurs when event a occurs, the first model may be P (output of vehicle interface unit|vehicle state) and indicate a correlation between the vehicle state and the output of the vehicle interface unit 110.

The model generation unit 140 may generate the first model using the whole or a recent part of the vehicle information stored in the storage 130.

If a recent part of the vehicle information is used, the vehicle information used to generate the first model may be information stored within a certain period from a point of time when the first model is generated, and the certain period may be a week or a day. In an embodiment of the present invention, the certain period is not restrictive and may be set by a designer, set and changed by the user, or automatically changed by the model generation unit 140 according to a success rate of the second model to be described below.

For example, if the model generation unit 140 generates the first model using 10 pieces of vehicle information stored in the storage 130, and if the 10 pieces of vehicle information include 5 pieces of vehicle information indicating that the vehicle state is vehicle state 1 and the 5 pieces of vehicle information include 1 piece of vehicle information indicating that the output of the AVN display 111*b* is an audio screen, the probability that the AVN display 111*b* displays an audio screen when the vehicle state is vehicle state 1, i.e., a conditional probability $P_{AVN}$ (B|vehicle state 1) of a case in which the vehicle state is vehicle state 1 and the AVN display 111*b* displays an audio screen, is 20%.

For example, in FIG. 18, when the vehicle state is vehicle state 1, a probability that the AVN display 111*b* displays a navigation screen is 70%, a probability that the AVN display 111*b* displays an audio screen is 30%, and a probability that the AVN display 111*b* displays a video screen is 0%.

When the vehicle state is vehicle state 2, a probability that the cluster display 112*b* displays a navigation screen is 30%, a probability that the cluster display 112*b* displays a driving information screen is 40%, and a probability that the cluster display 112*b* displays an audio screen is 30%.

When the vehicle state is vehicle state 3, a probability that the HUD 113*b* displays a speed information screen is 100%, and a probability that the HUD 113*b* displays another screen is 0%.

When the vehicle state is the same, a sum of conditional probabilities for one display should be 100%. For example, $P(A \cup B \cup C|1)=100\%$. This principle equally applies to the other vehicle states and the other displays.

The model generation unit 140 may update the conditional probabilities included in the first model, every certain cycle. The cycle to update the conditional probabilities is referred to as a second update cycle. The second update cycle may be equal to or greater than the first update cycle. For example, if the vehicle information stored in the storage 130 is updated every 1 sec., the conditional probabilities may also be updated every 1 sec. whenever the vehicle information is updated. Alternatively, the conditional probabilities may be updated every 1 min.

The model generation unit 140 extracts cases having conditional probabilities equal to or greater than a preset threshold value from the first model, and generates the second model using the vehicle state and the output of the vehicle interface unit 110 in the extracted cases.

The second model is a rule model to determine an output of the vehicle interface unit 110 corresponding to a current vehicle state, i.e., an output of the vehicle interface unit 110 predicted as being preferred by the user in a current vehicle state, using a rule defined by a vehicle state condition and a display result.

Vehicle states in cases having conditional probabilities equal to or greater than the threshold value may be set as vehicle state conditions, and outputs of the vehicle interface unit 110 in those cases may be set as display results. The second model may include a plurality of rules defined by the conditions and the results.

For example, if the threshold value for the conditional probabilities is set to 70%, cases having conditional probabilities equal to or greater than 70% are extracted from the first model. The threshold value for the conditional probabilities may be set by a designer, set and changed by the user, or automatically set and changed by the model generation unit 140 according to a success rate of the second model to be described below.

If there are two or more cases having conditional probabilities equal to or greater than the threshold value are extracted with respect to the same vehicle state and the same display, a case having a higher conditional probability may be extracted or an arbitrary case may be selected. Even though the two or more cases having conditional probabilities equal to or greater than the threshold value have the same conditional probability, an arbitrary case may be selected.

Otherwise, if there is no case having a conditional probability equal to or greater than the threshold value with respect to one vehicle state, the output of the vehicle interface unit 110 is not automatically controlled, and a current output may be constantly maintained.

The second model shown in FIG. 19 is based on the first model shown in FIG. 18. Referring to FIGS. 18 and 19, the cases having conditional probabilities equal to or greater than 70% include a case in which the vehicle state is vehicle state 1 and the AVN display 111*b* displays a navigation screen (rule 1), a case in which the vehicle state is vehicle state 2 and the AVN display 111*b* displays a navigation screen (rule 2), and a case in which the vehicle state is vehicle state 3 and the AVN display 111*b* displays a navigation screen (rule 3).

A case in which the vehicle state is vehicle state 1 and the cluster display 112*b* displays a navigation screen (rule 4), and a case in which the vehicle state is vehicle state 3 and the cluster display 112*b* displays a navigation screen (rule 5) also have conditional probabilities equal to or greater than 70%, and thus are extracted to generate the second model.

In addition, a case in which the vehicle state is vehicle state 1 and the HUD 113*b* displays a navigation screen (rule 6), a case in which the vehicle state is vehicle state 2 and the HUD 113*b* displays a proximity sensor screen (rule 7), and a case in which the vehicle state is vehicle state 3 and the HUD 113*b* displays a speed information screen (rule 8) also have conditional probabilities equal to or greater than 70%, and thus are extracted to generate the second model.

The first and second models generated by the model generation unit 140 may be stored in the storage 130 and updated as the vehicle information is updated.

The controller 150 controls the output of the vehicle interface unit 110 based on the second model generated by the model generation unit 140. Specifically, the controller 150 may determine a current vehicle state, search for a rule of the second model stored in the storage 130, in which the current vehicle state is set as a vehicle state condition, and control the output of the vehicle interface unit 110 to correspond to a display result of the rule if the rule is found.

Accordingly, in the example of FIG. 19, if the current vehicle state is vehicle state 1, all of the AVN display 111*b*, the cluster display 112*b*, and the HUD 113*b* may be controlled to display a navigation screen according to rule 1, rule 4, and rule 6.

If the current vehicle state is vehicle state 2, the AVN display 111*b* may be controlled to display a navigation screen according to rule 2, and the HUD 113b may be controlled to display a proximity sensor screen according to rule 7. With respect to the cluster display 112b, since there is no case having a conditional probability equal to or greater than the threshold value when the vehicle state is vehicle state 2, the controller 150 may not control the cluster display 112b and a current state of the cluster display 112b may be constantly maintained.

Alternatively, if the current vehicle state is vehicle state 3, the AVN display 111b may be controlled to display a navigation screen according to rule 3, the cluster display 112b may be controlled to display a navigation screen according to rule 5, and the HUD 113b may be controlled to display a speed information screen according to rule 8.

In addition to the vehicle state condition and the display result, a success rate of a rule may also be a factor of the second model. A success rate of a generated rule may be set to an initial value, a screen of a display may be switched according to a rule corresponding to a current vehicle state, and then the success rate may be increased or reduced according to whether the switched screen is changed. If the success rate of the rule is dropped to be equal to or less than a threshold value, the rule is regarded as having no reliability and a conditional probability of the first model in a case corresponding to the rule is initialized.

Specifically, after a screen of a display is automatically switched according to a rule of the second model, if the switched screen is maintained for a threshold time, i.e., if the user does not change the switched screen, this is determined as one-time success and a success rate is increased. On the other hand, if the user changes the output of the vehicle interface unit 110 within the threshold time, this is determined as one-time failure and the success rate is reduced.

The threshold time used to determine the success rate may be preset or set by the user, or automatically set or changed by the model generation unit 140 in consideration of reliability of the second model.

For example, if the initial value of the success rate is set to 50% and the threshold value of the success rate is set to 40%, in the example of FIG. 18, conditional probabilities in cases corresponding to rule 4 and rule 6 are initialized.

Although screens displayed on the AVN display 111b, the cluster display 112b and the HUD 113b are automatically controlled in the above embodiments, only one or two of the AVN display 111b, the cluster display 112b and the HUD 113b may be controlled instead of controlling all displays.

Alternatively, the user may select an automatic control function for the vehicle interface unit 110, and the output of the vehicle interface unit 110 may be automatically controlled only when the user selects the automatic control function.

Otherwise, automatic control of a screen may be performed only when a corresponding function is turned on or regardless of whether the corresponding function is turned on or off.

For example, in the latter case, even though a navigation function is currently turned off, if a rule corresponding to a current vehicle state has a display result to display a navigation screen, the controller 150 may control the AVN device 111 to turn on the navigation function. Likewise, even though an audio function is currently turned off, if a rule corresponding to a current vehicle state has a display result to display an audio screen, the controller 150 may control the AVN device 111 to turn on the audio function.

Alternatively, on/off of each function performed by the AVN device 111 may be automatically controlled regardless of screen control. Specifically, when the user enjoys listening to a favorite radio program in a specific time on rainy days, a vehicle state is defined by rain sensor information and a current time, and an output of the vehicle interface unit 110 corresponding the vehicle state is set as content provided by the AVN device 111, if a current vehicle state indicate rain and the specific time, even though an audio function is not currently turned on, the controller 150 may automatically turn on the AVN device 111 to output the favorite radio program of the user.

The vehicle interface unit 110 may be a lighting device or a temperature control device. In this case, vehicle information may be acquired according to the above-described scheme, first and second models may be generated based on the acquired vehicle information, and thus, the lighting device or the temperature control device may be automatically controlled.

For example, when the vehicle interface unit 110 is a lighting device, a vehicle state may be defined by rain sensor information and daytime/nighttime information. If the lighting device is capable of displaying a plurality of colors or has a plurality of brightness levels, brightness levels or colors of the lighting device in a case in which it rains and the vehicle 100 is driven during the day (vehicle state 1), a case in which it rains and the vehicle 100 is driven at night (vehicle state 2), a case in which it doesn't rain and the vehicle 100 is driven during the day (vehicle state 3), and a case in which it doesn't rain and the vehicle 100 is driven at night (vehicle state 4) may be correspondingly stored as outputs of the vehicle interface unit 110.

A description is now given of a method for controlling a vehicle, according to an embodiment of the present invention. The vehicle 100 according to the previous embodiments is applicable to the method according to the current embodiment, and thus, the descriptions of the previous embodiments are equally applicable to the method to be described below.

Figure 20:
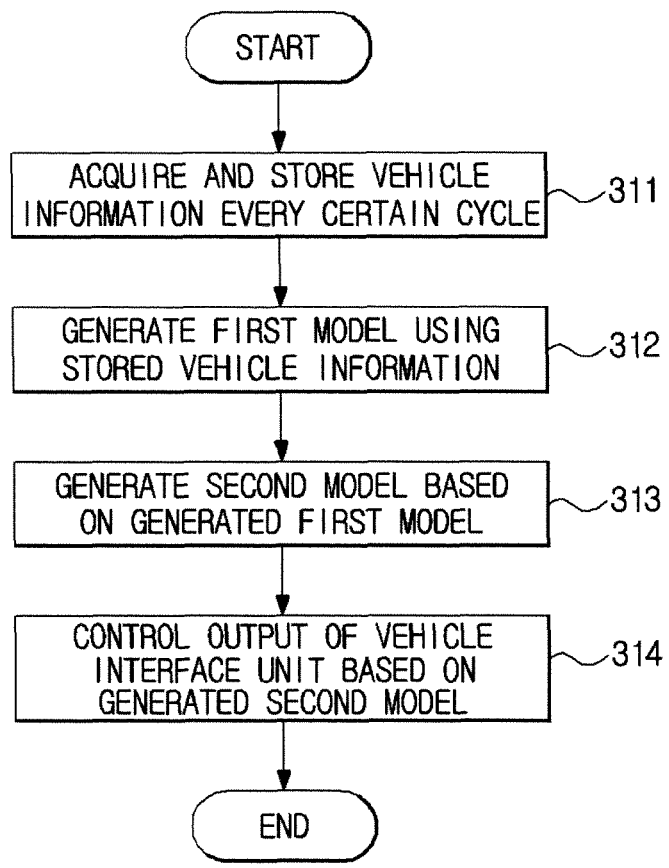
FIG. 20 is a flowchart of a method for controlling a vehicle, according to an embodiment of the present invention.

FIG. 20 is a flowchart of a method for controlling a vehicle according to an embodiment of the present invention.

Referring to FIG. 20, vehicle information is acquired and stored at every certain cycle (311). Here, the certain cycle to acquire the vehicle information is referred to as a first update cycle. The vehicle information includes information about a vehicle state and an output of a vehicle interface unit in the vehicle state. The vehicle state is defined by one or a combination of acquirable individual pieces of information. The acquirable individual pieces of information may include whether a destination is set, whether the vehicle is driven during the day/at night, whether the brake is depressed, the speed of the vehicle, whether the vehicle is powered on/off, external air temperature, rain sensor information, global positioning system (GPS) information (indicating road types), road information (acquired by a navigation device), current time, whether an AVN function is performed, etc.

The vehicle interface unit may include all devices, the output of which varies according to user manipulation, among devices included in the vehicle, and the output of the vehicle interlace unit may be related to visual or audio content, or to an environment (e.g., lighting or temperature) inside the vehicle. Accordingly, in the method according to the current embodiment, the vehicle interface unit may be a display device included in the vehicle (e.g., AVN device, cluster, or HUD module), or a temperature control device or a lighting device.

A first model is generated using the stored vehicle information (312). The first model is a probability model to indicate a correlation between a current vehicle state and an output of the vehicle interface unit as a probability value using the theory of conditional probability. Accordingly, the first model may be generated by calculating a conditional probability of the output of the vehicle interface unit for each vehicle state using the whole or a recent part of the stored vehicle information.

As the vehicle information is updated, the first model may also be updated in a second update cycle. The second update cycle may be equal to or greater than the first update cycle.

A second model is generated based on the generated first model (313). Specifically, the second model is generated using vehicle states in cases having conditional probabilities equal to or greater than a preset threshold value, and outputs of the vehicle interface unit corresponding to the vehicle states. The second model is a rule model to determine an output of the vehicle interface unit preferred by the user in a current vehicle state, using a rule defined by a vehicle state condition and a display result. Vehicle states in cases having conditional probabilities equal to or greater than the threshold value may be set as vehicle state conditions, and outputs of the vehicle interface unit corresponding to the vehicle states may be set as display results. The second model may include a plurality of rules defined by the vehicle state conditions and the display results.

The output of the vehicle interface unit is controlled based on the generated second model (314). Specifically, a current vehicle state may be determined, a rule of the generated second model in which the current vehicle state is set as a vehicle state condition may be found, and the output of the vehicle interface unit may be controlled to correspond to a display result of the found rule.

FIG. 21 is a flowchart of a method for controlling a vehicle in consideration of a success rate of a rule of a second model, according to an embodiment of the present invention.

Referring to FIG. 21, operations 321 to 324 are the same as operations 311 to 314 of FIG. 20, and thus detailed descriptions thereof are omitted here.

In addition to the condition and the result, a success rate of a rule may also be a factor of the second model. Accordingly, it is determined whether the output of the vehicle interface unit is maintained for a threshold time (325), and the success rate of the rule is updated according to a result of determination (326).

Specifically, the success rate of the rule is set to an initial value and the output of the vehicle interface unit is controlled according to the rule of the second model. Then, if the output is maintained for the threshold time, i.e., if the user does not change the output of the vehicle interface unit, this is determined as one-time success and the success rate is increased. On the other hand, if the user changes the output of the vehicle interface unit within the threshold time, this is determined as one-time failure and the success rate is reduced.

The threshold time used to determine the success rate may be set by a designer or the user, or automatically set or changed by a model generation unit in consideration of reliability of the second model.

According to the above-described vehicle and the method for controlling the same, since a vehicle interface unit is automatically controlled by reflecting user preference, manipulation loads and visual attention distribution of a user while driving may be minimized and thus safety may be improved.

In addition, since the vehicle automatically provides user-desired service to the user, customer satisfaction may be improved.

As is apparent from the above description, manipulation loads and visual attention distribution of a user may be minimized, and satisfaction of the user may be improved by automatically controlling a vehicle interface unit of a vehicle by reflecting user preference.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A vehicle comprising:
a vehicle interface unit, an output of which is controlled according to user manipulation;
a storage configured to store information about a vehicle state and the output of the vehicle interface unit in the vehicle state;
a model generation unit configured to generate a first model to indicate a correlation between the vehicle state and the output of the vehicle interface unit as a conditional probability and a second model to determine the output of the vehicle interface unit corresponding to a current vehicle state using a rule defined by a vehicle state condition and an output of the vehicle interface unit, in which the first model and the second model are included in a user preference model; and
a controller configured to control the output of the vehicle interface unit based on the user preference model.

2. The vehicle according to claim 1, where the storage stores the information about the vehicle state and the output of the vehicle interface unit in the vehicle state every first update cycle.

3. The vehicle according to claim 2, wherein the first updated cycle is set or changed by a user.

4. The vehicle according to claim 2, wherein the storage erases the previous information stored in the storage when a used capacity of the storage exceeds a storage threshold value.

5. The vehicle according to claim 1, wherein the model generation unit generates the first model by calculating the conditional probability of the output of the vehicle interface unit for each vehicle state based on the stored information about the vehicle state and the output of the vehicle interface unit in the vehicle state.

6. The vehicle according to claim 5, wherein the model generation unit updates the first model by calculating the conditional probability every second updated cycle.

7. The vehicle according to claim 6, wherein the second updated cycle is equal to or greater than the first updated cycle.

8. The vehicle according to claim 1, wherein the model generation unit extracts a vehicle state having the conditional probability equal to or greater than a probability threshold value and the output of the vehicle interface unit corresponding to the vehicle state from the first model, and sets the extracted vehicle state as the vehicle state condition to define the rule number and sets the extracted output of the vehicle interface unit as a display result to define the rule.

9. The vehicle according to claim 8, wherein the controller determines the current vehicle state and searches for the rule of the generated second model, in which the current vehicle state is set as the vehicle state condition.

10. The vehicle according to claim 9, wherein the controller controls the output of the vehicle interface unit according to the rule in which the current vehicle state is set as the vehicle state condition, when the rule is found.

11. The vehicle according to claim 10, wherein the model generation unit determines whether the output of the vehicle interface unit is changed within a threshold time after the output of the vehicle interface unit is controlled.

12. The vehicle according to claim 11, wherein the model generation unit updates a success rate of the rule based on a determination result of whether or not the output of the vehicle interface unit is changed.

13. The vehicle according to claim 12, wherein the model generation unit increases the success rate of the rule number if the output of the vehicle interface unit is not changed for the threshold time after the output of the vehicle interface unit is controlled.

14. The vehicle according to claim 13, wherein the model generation unit reduces the success rate of the rule if the output of the vehicle interface unit is changed within the threshold time after the second output of the vehicle interface unit is controlled.

15. The vehicle according to claim 14, wherein the model generation unit erases a rule having a success rate dropped to be equal to or less than a success rate threshold value, and initializes the conditional probability corresponding to the erased rule.

16. The vehicle according to claim 1, wherein the vehicle interface unit comprises at least one of an audio video navigation (AVN) device, a cluster, a head up display (HUD), a lighting device to control lighting inside the vehicle, and a temperature control device to control temperature inside the vehicle.

* * * * *